United States Patent Office 2,705,347
Patented Apr. 5, 1955

2,705,347

SYSTEM FOR SEPARATING ANIMAL FIBERS FROM VEGETABLE RESIDUES WITH THE USE OF HIGH FREQUENCY CURRENTS

Stefano Carbonetto, Milan, Italy

No Drawing. Application March 3, 1949, Serial No. 79,524

Claims priority, application Italy July 24, 1948

9 Claims. (Cl. 19—66)

This invention relates to a process for scouring real fibers, and particularly for separation of animal fibers from vegetable residues.

It is known that wool resulting from shearing of sheep, contains many impurities, but among same particularly troublesome to separate are the vegetable residues made up of small curls known under the name of burs, which on account of their constitution incorporate strongly with the woollen fibers, making it very difficult to separate these residues from the fibers.

Up to date these residues have been separated from the wool by carbonizing with suitable treatment, the burs and other vegetable residues, but such treatments required all the mass of the wool to undergo them, which had a harmful effect on the constitution of the fibers.

This invention avoids the aforementioned trouble, in as much for performance of the invention only heating at a very low temperature is required, and a succession of other operations that leave the constitution of the wool fibers intact.

The fundamental of the operation which is the subject-matter of this invention, is high frequency treatment of the material being worked, and thanks to which wool fibers come away and free from vegetable residues thereby rendering extremely easy the separation of same from the aforesaid fibers.

In other words, the process in question includes a preliminary treatment of the impure wool that allows afterwards easy metallisation of the vegetable parts, but leaves the animal fibers unchanged. After this operation follows metallisation treatment, by the superposition of the metal particles on the vegetable substances alone preferably, in suitable electrolytic baths. These operations are followed by squeezing the material coming out from the bath, and afterwards by treating the material with high frequency that fluffs out the wool fibers from the burs or vegetable residues of the same kind, and thereafter complete drying of the material and separation of the animal fibers from the vegetable substances, preferably by means of the combined action of a magnetic field acting on the metallised vegetable particles, and suction whose effect is only felt by the animal fibers.

According to a variation, which is likewise an object of this invention, the process is simplified, thereby allowing the use for the majority of the already existing plants and allowing results to be obtained however, which if they are not so brilliant as those obtainable with the system mentioned hereinbefore, are always superior to those obtained with the processes known up to date.

Two ways of practical performance of the said system will now be described with more details for the purpose of giving a better illustration of the invention.

In conformity with a first way of carrying out the process, before the wool is scoured in the form of tape coming from the scouring baths, it is made to pass between two rollers of which one distributes graphite on the abovesaid fiber tape, while this advances below the roller.

The pressure action due to the combination of the distributing roller mentioned above with a pressure roller underneath, causes adhesion of the graphite or the like, on the vegetable residues mixed with the wool fibers, while the latter either on account of the fat with which they are still impregnated or for their intrinsic nature do not stably keep the graphite powder. The vegetable residues are highly porous so that they effectively absorb the graphite. Also, the impregnation of the vegetable residues with graphite is facilitated by the water content of the vegetable residues. At the time of this operation, the animal fibers are still coated with a certain amount of fat so that they have a natural protection and so that the graphite does not injure the animal fibers in any way. In this way there is a coating of the burs and other vegetable residues with graphite particles. In addition to the fat in the wool fibers, which prevents the graphite powder from settling thereon, these wool fibers have a smooth outer surface which additionally prevents the graphite from clinging thereto. On the other hand, the vegetable fibers have a rough surface which, in addition to the porosity of these fibers, promotes the deposition of graphite thereon.

Instead of a graphiting treatment like that described hereinbefore, the raw wool to be scoured could undergo a treatment with nitrate of silver or with another solution containing a metallic salt suitable for self-depositing on the vegetable particles. Here again the exceedingly porous nature of the vegetable residues causes the metallic salts to deposit themselves on the vegetable residues, but these metallic salts will not cling to the animal fibers because they are still impregnated with a certain amount of fat. This step in the process renders the vegetable fibers highly conductive to electricity. As is the case with the above-described graphite deposition, the fat in the animal fibers and the smooth outer surface thereof prevents the deposition of the metallic salt thereon, while the rough surface of the vegetable fibers, in addition to their porosity, promotes the deposition of the metallic salt thereon. With this end in view the wool being worked is soaked with a solution of the kind mentioned above and then dried instead of passing through the rollers aforesaid. After this first treatment, the material is put in a galvanic bath containing a metallic salt, preferably of iron, and here with a process similar to those generally used for galvanoplastics, the vegetable particles already covered with graphite, or a metal such as silver, are again covered with a film of iron or another suitable metal. As is customary in conventional electroplating processes, one electrode is in contact with the liquid of the bath and the other electrode comprises the article which is to be plated and an electrical conductor connected thereto. In the particular process involved here, the vegetable particles are all mixed together so that almost every vegetable particle is in contact with another vegetable particle, and an electrical conductor is simply placed in contact with the mass of particles in the bath so as to carry away current from the vegetable particles by contacting one or more of the latter. Therefore, these vegetable particles themselves form an electrode.

Preferably the electrodes of the galvanic bath must be coupled to a direct electric current source, and the polarity of the electrodes must be inverted periodically. The burrs and vegetable residues act as a negative electrode in the galvanic bath and the positive electrodes are suitably designed to emit the amount of material required to metallize the burrs and vegetable residues. The inversion of the polarity of the electrodes is required in order to avoid an overabundant deposition of metallizing material on the vegetable particles.

This metallic covering can be obtained in a different way to that of the galvanic bath, for instance by spraying, but the system described above is undoubtedly to be preferred. Also, the above-mentioned rough surface of the vegetable fibers promotes the deposition of the filings thereon, and the fat and smooth outer surface of the animal fibers prevents the deposition of these filings thereon. In these baths the feed of the wool can be advantageously operated by forced circulation of the liquid in the said bath.

The operation which follows is that of pressing the material coming out of the bath that should preferably take place by having the aforesaid material pass between rollers suitable for the purpose. Thus the double result is obtained: the drying of the wool and the recovery of the bath liquid.

After the foregoing the material undergoes the action of electric fields in high frequency, obtained with any preferred or known kind of apparatus, under the action of which the animal fibers too receive a certain electric charge which makes the fibers rise and free themselves from the vegetable residues on which they are still entangled. The high frequency field in which all of the fibers are located causes all of the fibers to become electrostatically charged. Inasmuch as the wool fibers are poor conductors of electricity, they become charged over their entire surface to a relatively great extent. The vegetable fibers also become charged, but, due to the electrical conductivity of their coatings, the charge therein becomes concentrated at the ends of the mass of the vegetable fibers which are in contact with each other so that there will be no charge in the vegetable fibers located intermediate the ends of such a mass. All of the fibers of the mass of vegetable and animal fibers have the same charge induced therein by the high frequency field, and the result is that the wool fibers in particular repulse each other. There will also be a repulsion between any vegetable fibers which happen to have a charge therein and adjacent wool fibers. The result of this action is to cause an unwinding and an unmingling of the fibers from each other so that the entire mass becomes fluffed out to facilitate the subsequent separation of the animal and vegetable fibers. A high frequency field is used because this produces a series of repeated charges which greatly increases the extent to which the mass of fibers become fluffed out and unentwined from each other, as compared to, for example, a direct current field which would produce only one charge and would cause the fibers to assume a position of equilibrium at which they would not be fluffed out to the same extent as with the high frequency field.

The frequency of these electric fields can vary even to a considerable extent in regard to the material under treatment, but particularly with reference to the kind of metallisation to which the vegetable impurities mixed with the wool have been subjected previously. In view of the foregoing the frequency of these fields can vary between 1500 and 18,000 kilo-cycles.

Afterwards, said material is sent to a dryer, which can be of any kind, but preferably junctioned with the foregoing apparatus, and the heat required will be obtained by means of high frequency currents. The advantage is thus obtained of a very quick drying of the material under treatment owing to the combined action and of the special charge due to high frequency, thereby ensuring continuous operation of the plant and avoiding all and any harmful action on the wool fibers.

The dried material is then sent into a chamber, where under the action of a magnetic field the metallised vegetable particles and at the same time the wool fibers carried along therewith are attracted in a desired direction where they undergo a suction action, which the metallised vegetable particles are not subject to since they are attracted by the magnetic field, which suction action is sufficient to suck and convey the animal fibers completely open and free from the aforesaid vegetable impurities, in another direction towards gathering elements for further workmanship.

According to the other way of performance of the invention foreseen above, the fibers, of wool for instance, after scouring are sent into a bath of metallic salts that soak the vegetable parts, and the salts contained in the said solution are crystallised and deposit on the said vegetable residues and transform their mechanical and electrical characteristics. The salts are absorbed by the vegetable matter due to the above mentioned high porosity of the vegetable matter. Also, the above-mentioned roughness of the vegetable matter promotes the deposition of salts thereon, while the smoothness and fat content of the animal fibers prevents such a deposition on the animal fibers. When the fibers come out of this bath, they are dried and then placed in a high frequency oven where, owing to the electric action, the wool comes away from the vegetable residues, as described above, which undergo a treatment of baking which makes them very brittle and therefore easy to reduce to powder in the following stage where said fibers pass through the cards used in known processes for removal of burs.

As examples of the solutions of the baths used for making the above-mentioned process an accomplished fact, can be quoted for the first bath solutions of any metallic salts, provided that they are such as to not colour or damage in any other way the wool fibers, and for the second bath or fixing bath a concentrated solution of sea salt has been found to be very suitable, or generally, a solution of a mixture of several salts with a high percentage of manganese salts.

As examples of the frequencies used for the high frequency electric fields for carrying out the process, may be pointed out, frequencies comprised between 1500 and 18,000 kilo-cycles.

The term "electromagnetic" used in this specification is intended to mean both electrical and magnetic.

The details for carrying out the different operations making up the processes described hereinbefore, the equipment for carrying out the different operations and all the details of workmanship, can of course vary according to requirements without leaving the range of this invention.

What I claim is:

1. A process for separating, in a mixture of animal fibers and vegetable residues, said animal fibers and vegetable residues from each other comprising the steps of incorporating substantially only into said vegetable residues a magnetic substance; subjecting the mixture to the influence of a high frequency electric field to fluff out said mixture; subjecting said mixture to the action of a magnetic field acting in a first direction so that only said vegetable residues respond to said magnetic field; and simultaneously therewith subjecting said mixture to a suction action acting in a second direction different from said first direction so as to separate said vegetable residues and animal fibers from each other.

2. A process for separating, in a mixture of animal fibers and vegetable residues, said animal fibers and vegetable residues from each other comprising the steps of coating the vegetable residues with an electrically conductive material; drying the mixture; subjecting the mixture to the action of an electric field of high frequency so as to fluff out said animal fibers from said vegetable residues and from each other; and separately collecting said vegetable residues and animal fibers, respectively.

3. A process for separating, in a mixture of animal fibers and vegetable residues, said animal fibers and vegetable residues from each other comprising the steps of coating the vegetable residues with an electrically conductive material to prepare the residues for an electrolytic coating; then electrolytically coating the vegetable residues with a metallic electrically conductive material; drying the mixture; subjecting the mixture to the action of an electric field of high frequency so as to fluff out said animal fibers from said vegetable residues and from each other; and separately collecting said vegetable residues and animal fibers, respectively.

4. A process for separating, in a mixture of animal fibers and vegetable residues, said animal fibers and vegetable residues from each other comprising the steps of distributing graphite over the vegetable residues; immersing the mixture in a galvanic bath so as to coat the vegetable particles with a metallic electrically conductive material; drying the mixture; subjecting the mixture to the action of an electric field of high frequency so as to fluff out said animal fibers from said vegetable residues and from each other; and separately collecting said vegetable residues and animal fibers, respectively.

5. A process for separating, in a mixture of animal fibers and vegetable residues, said animal fibers and vegetable residues from each other comprising the steps of immersing the mixture in a solution of electrically conductive metallic salts so that said salts are deposited on said vegetable residues; immersing the mixture in a galvanic bath so as to coat the vegetable particles with a metallic electrically conductive material; drying the mixture; subjecting the mixture to the action of an electric field of high frequency so as to fluff out said animal fibers from said vegetable residues and from each other; and separately collecting said vegetable residues and animal fibers, respectively.

6. A process for separating, in a mixture of animal fibers and vegetable residues, said animal fibers and vegetable residues from each other comprising the steps of coating the vegetable residues with an electrically conductive material to prepare the residues for an electrolytic coating; then electrolytically coating the vegetable residues with a magnetic electrically conductive material; drying the mixture; subjecting the mixture to the action of an electric field of high frequency so as to fluff out said animal fibers from said vegetable residues and from each other; and simultaneously subjecting the mixture to the influence of a magnetic field and to a suction action which act in defferent directions, respectively, whereby the vegetable residues are attracted away from the animal fibers by said magnetic field and whereby said animal fibers are drawn away from said vegetable fibers due to said suction action.

7. A process for separating, in a mixture of animal fibers and vegetable residues, said animal fibers and vegetable residues from each other comprising the steps of distributing graphite over the vegetable residues; immersing the mixture in a galvanic bath so as to coat the vegetable particles with a magnetic metallic electrically conductive material; drying the mixture; subjecting the mixture to the action of an electric field of high frequency so as to fluff out said animal fibers from said vegetable residues and from each other; and simultaneously subjecting the mixture to the influence of a magnetic field and to a suction action which respectively act in different directions whereby the vegetable residues are attracted away from the animal fibers by said magnetic field and whereby said animal fibers are drawn away from said vegetable fibers due to said suction action.

8. A process for separating, in a mixture of animal fibers and vegetable residues, said animal fibers and vegetable residues from each other comprising the steps of immersing the mixture in a solution of electrically conductive metallic salts so that said salts are deposited on said vegetable residues; immersing the mixture in a galvanic bath so as to coat the vegetable particles with a magnetic metallic electrically conductive material; drying the mixture; subjecting the mixture to the action of an electric field of high frequency so as to fluff out said animal fibers from vegetable residues and from each other; and simultaneously subjecting the mixture to the influence of a magnetic field and to a suction action which respectively act in different directions whereby the vegetable residues are attracted away from the animal fibers by said magnetic field and whereby said animal fibers are drawn away from said vegetable fibers due to said suction action.

9. A process for separating, in a mixture of animal fibers and vegetable residues, said animal fibers and vegetable residues from each other, comprising the steps of incorporating into said vegetable residues a substance imparting to the same electromagnetic properties different from those of said animal fibers so as to obtain a mixture of animal fibers and vegetable residues having different electromagnetic properties, respectively; subjecting said mixture to the action of an electric field of high frequency creating an electrostatic charge on said animal fibers, loosening the latter from said vegetable residues, and fluffing out the mixture; and removing the vegetable residues from said thus fluffed out mixture by a force which affects only said vegetable residues having said electromagnetic properties.

References Cited in the file of this patent
UNITED STATES PATENTS

| Number | Name | Date |
|---|---|---|
| 43,647 | Ruschhaupt et al. | July 26, 1864 |
| 461,579 | Johns | Oct. 20, 1891 |
| 813,404 | Cook | Feb. 27, 1906 |
| 1,604,406 | Gayle | Oct. 26, 1926 |
| 1,968,860 | Strang | Aug. 7, 1934 |
| 1,968,861 | Strang | Aug. 7, 1934 |
| 2,263,681 | Hart, Jr. | Nov. 25, 1941 |